(12) United States Patent
Leahy et al.

(10) Patent No.: US 9,110,567 B2
(45) Date of Patent: *Aug. 18, 2015

(54) SYSTEM AND METHOD FOR ENABLING USERS TO INTERACT IN A VIRTUAL SPACE

(71) Applicant: WORLDS INC., Brookline, MA (US)

(72) Inventors: David Leahy, Oakland, CA (US); Judith Challinger, Santa Cruz, CA (US); B. Thomas Adler, San Francisco, CA (US); S. Mitra Ardon, San Francisco, CA (US)

(73) Assignee: Worlds, Inc., Brookline, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/133,616

(22) Filed: Dec. 18, 2013

(65) Prior Publication Data

US 2014/0208238 A1 Jul. 24, 2014

Related U.S. Application Data

(63) Continuation of application No. 13/162,540, filed on Jun. 16, 2011, now Pat. No. 8,640,028, which is a continuation of application No. 13/084,195, filed on Apr. 11, 2011, now Pat. No. 8,407,592, which is a continuation of application No. 13/083,504, filed on (Continued)

(51) Int. Cl.
*G06F 13/00* (2006.01)
*G06F 15/00* (2006.01)
*G06F 3/0482* (2013.01)

(Continued)

(52) U.S. Cl.
CPC .............. *G06F 3/0482* (2013.01); *A63F 13/12* (2013.01); *G06F 3/04815* (2013.01); *G06N 3/006* (2013.01); *H04L 12/1813* (2013.01); *H04L 12/1827* (2013.01); *H04L 29/06* (2013.01); *H04L 67/10* (2013.01); *H04L 67/16* (2013.01); *H04L 67/18* (2013.01); *H04L 67/306* (2013.01); *H04L 67/38* (2013.01); *H04W 4/02* (2013.01); *H04W 4/028* (2013.01); *A63F 2300/407* (2013.01); *A63F 2300/513* (2013.01); *A63F 2300/5546* (2013.01); *A63F 2300/5553* (2013.01); *A63F 2300/572* (2013.01); *A63F 2300/8082* (2013.01); *H04L 67/1002* (2013.01);

(Continued)

(58) Field of Classification Search
CPC .............................. G06F 3/0482; G06N 3/006
USPC .......... 715/706, 756, 851–853, 751–753, 762
See application file for complete search history.

(56) References Cited

U.S. PATENT DOCUMENTS

| 5,347,306 | A | * | 9/1994 | Nitta ............................. 348/14.1 |
| 5,491,743 | A | * | 2/1996 | Shiio et al. .................... 709/204 |
| 5,736,982 | A | * | 4/1998 | Suzuki et al. ................. 715/706 |

*Primary Examiner* — Kevin Nguyen
(74) *Attorney, Agent, or Firm* — Anatoly S. Weiser, Esq.

(57) ABSTRACT

The present invention provides a highly scalable architecture for a three-dimensional graphical, multi-user, interactive virtual world system. In a preferred embodiment a plurality of users interact in the three-dimensional, computer-generated graphical space where each user executes a client process to view a virtual world from the perspective of that user. The virtual world shows avatars representing the other users who are neighbors of the user viewing the virtual word. In order that the view can be updated to reflect the motion of the remote user's avatars, motion information is transmitted to a central server process which provides positions updates to client processes for neighbors of the user at that client process. The client process also uses an environment database to determine which background objects to render as well as to limit the movement of the user's avatar.

20 Claims, 5 Drawing Sheets

Related U.S. Application Data

Apr. 8, 2011, now Pat. No. 8,161,385, which is a continuation of application No. 12/406,970, filed on Mar. 19, 2009, now Pat. No. 8,145,998, which is a continuation of application No. 12/406,968, filed on Mar. 19, 2009, now Pat. No. 8,082,501, which is a continuation of application No. 12/353,218, filed on Jan. 13, 2009, now Pat. No. 7,945,856, which is a continuation of application No. 11/591,878, filed on Nov. 2, 2006, now Pat. No. 7,493,558, which is a continuation of application No. 09/632,154, filed on Aug. 3, 2000, now Pat. No. 7,181,690, which is a continuation of application No. 08/747,420, filed on Nov. 12, 1996, now Pat. No. 6,219,045.

(60) Provisional application No. 60/020,296, filed on Nov. 13, 1995.

(51) Int. Cl.
*A63F 13/30* (2014.01)
*G06F 3/0481* (2013.01)
*G06N 3/00* (2006.01)
*H04L 12/18* (2006.01)
*H04L 29/06* (2006.01)
*H04W 4/02* (2009.01)
*H04L 29/08* (2006.01)

(52) U.S. Cl.
CPC ............... *H04L 67/14* (2013.01); *H04L 69/329* (2013.01); *H04L 2029/06054* (2013.01)

SYSTEM AND METHOD FOR ENABLING USERS TO INTERACT IN A VIRTUAL SPACE

CROSS-REFERENCE TO RELATED APPLICATIONS

This application is a continuation of and claims priority from U.S. patent application Ser. No. 13/162,540, filed Jun. 16, 2011, now allowed. The U.S. patent application Ser. No. 13/162,540 is a continuation of and claims priority from U.S. patent application Ser. No. 12/406,968, filed Mar. 19, 2009, now U.S. Pat. No. 8,082,501. The U.S. patent application Ser. No. 13/162,540 is also a continuation of and claims priority from U.S. patent application Ser. No. 12/406,970, filed Mar. 19, 2009, now U.S. Pat. No. 8,145,998. The U.S. patent application Ser. No. 13/162,540 is also a continuation of and claims priority from U.S. patent application Ser. No. 13/083,504, filed Apr. 8, 2011, now U.S. Pat. No. 8,161,385. The U.S. patent application Ser. No. 13/162,540 is also a continuation of and claims priority from U.S. patent application Ser. No. 13/084,195, filed Apr. 11, 2011, now U.S. Pat. No. 8,407,592. Each of the application Ser. Nos. 12/406,968, 12/406,970, 13/083,504, and 13/084,195 is a continuation of and claims priority from U.S. patent application Ser. No. 12/353,218, filed Jan. 13, 2009, now U.S. Pat. No. 7,945,856; which is a continuation of and claims priority from U.S. patent application Ser. No. 11/591,878, filed Nov. 2, 2006, now U.S. Pat. No. 7,493,558; which is a continuation of and claims priority from U.S. patent application Ser. No. 09/632,154, filed Aug. 3, 2000, now U.S. Pat. No. 7,181,690; which is a continuation of and claims priority from U.S. patent application Ser. No. 08/747,420, filed Nov. 12, 1996, now U.S. Pat. No. 6,219,045; which claims priority from U.S. Provisional Patent Application Ser. No. 60/020,296, filed Nov. 13, 1995.

The disclosures of all of the foregoing patent documents are incorporated herein by reference as if fully set forth herein, including specification, figures, abstract, claims, and tables (if present) of each of the documents.

BACKGROUND OF THE INVENTION

The present invention relates to the field of packet communications. More specifically, in one embodiment the invention provides an efficient communications network for client-server networks with large numbers of clients.

A client-server network is a network where one or more servers are coupled to one or more clients over a communications channel. Typically, each server and each client is assigned an address so that each can determine which network messages are directed to it. While such a system may have only one server, it typically has many clients. A server object is one which waits for a request from a client object and then performs some service in response to the client request. A client is an object that makes the request. The designation of a particular object (computer hardware and/or software process) as a "server" object or a "client" object is not fixed. Thus, a given object can be a server for some services and a client of other services.

A typical computer network has one or more file and print servers with a number of clients, where the clients are the desktop computers or workstations of the computer users, all coupled to a high-speed network cable. Client-server communications in such a network are easily handled for several reasons. When clients are not all communicating with the server at once the server need not be designed to handle all the clients at one time. Another reason is that the network traffic is much less than the network capacity furthermore, the clients in a typical computer network need not necessarily be communicating in real-time with the server. However, where many client machines or processes are communicating with each other in real-time through the server, several problems arise.

For example, where a client-server system is used for real-time exchange of information, such as a distributed virtual reality network where users at client machines visually and aurally interact with other users at other client machines, communication is much more difficult, especially where the information is high-bandwidth data such as audio streams, graphic images and image streams. One application of such a client-server system is for game playing, where the positions and actions of each user need to be communicated between all the players to inform each client of the state changes (position, actions, etc.) which occurred at the other clients. The server might maintain global state information and serve as a data server for the clients as they request visual, program and other data as the game progresses.

Some game systems use a peer-to-peer architecture. In a peer-to-peer architecture, a copy of the data which is common to all clients is kept by the client and information which needs to pass between clients is broadcast over the network. This limits the number of clients which can be connected to the network, because the number of messages passing between clients is on the order of the square of the number of clients. With true broadcasting, one message is sent and all clients listen for it, but not all network topologies can handle broadcasts. Where less than all the clients are participating in a game, for example, messages cannot be broadcast because there are clients which should not be receiving the broadcast message. Instead, the broadcast between the players is handled by generating one message to each player client.

This architecture is further limited where the network is not a dedicated network, but is an open network, such as the Internet. As used herein, the term "Internet" refers to the global inter-network of networks which communicates primarily using packets sent according to TCP/IP (Transport Control Protocol/Internet Protocol) standards well known in the art of computer intercommunication. With Internet communications, true broadcasting is not even possible because the network's extent is not known or fixed. Thus, messages to all players must be sent as separate messages. An additional problem with Internet communications is that packet delivery is not guaranteed nor is it even as reliable as a dedicated network.

Therefore, what is needed is an efficient system for communication between many client systems over dedicated or open networks to provide graphical interaction between users operating the client systems.

SUMMARY OF THE INVENTION

The present invention provides a highly scalable architecture for a three-dimensional graphical, multi-user, interactive virtual world system. In a preferred embodiment a plurality of users interact in the three-dimensional, computer-generated graphical space where each user executes a client process to view a virtual world from the perspective of that user. The virtual world shows avatars representing the other users who are neighbors of the user viewing the virtual word. In order that the view can be updated to reflect the motion of the remote user's avatars, motion information is transmitted to a central server process which provides positions updates to client processes for neighbors of the user at that client process. The client process also uses an environment database to determine which background objects to render as well as to limit the movement of the user's avatar.

A further understanding of the nature and advantages of the inventions herein may be realized by reference to the remaining portions of the specification and the attached drawings.

DESCRIPTION OF THE PREFERRED EMBODIMENT

Figure 1:
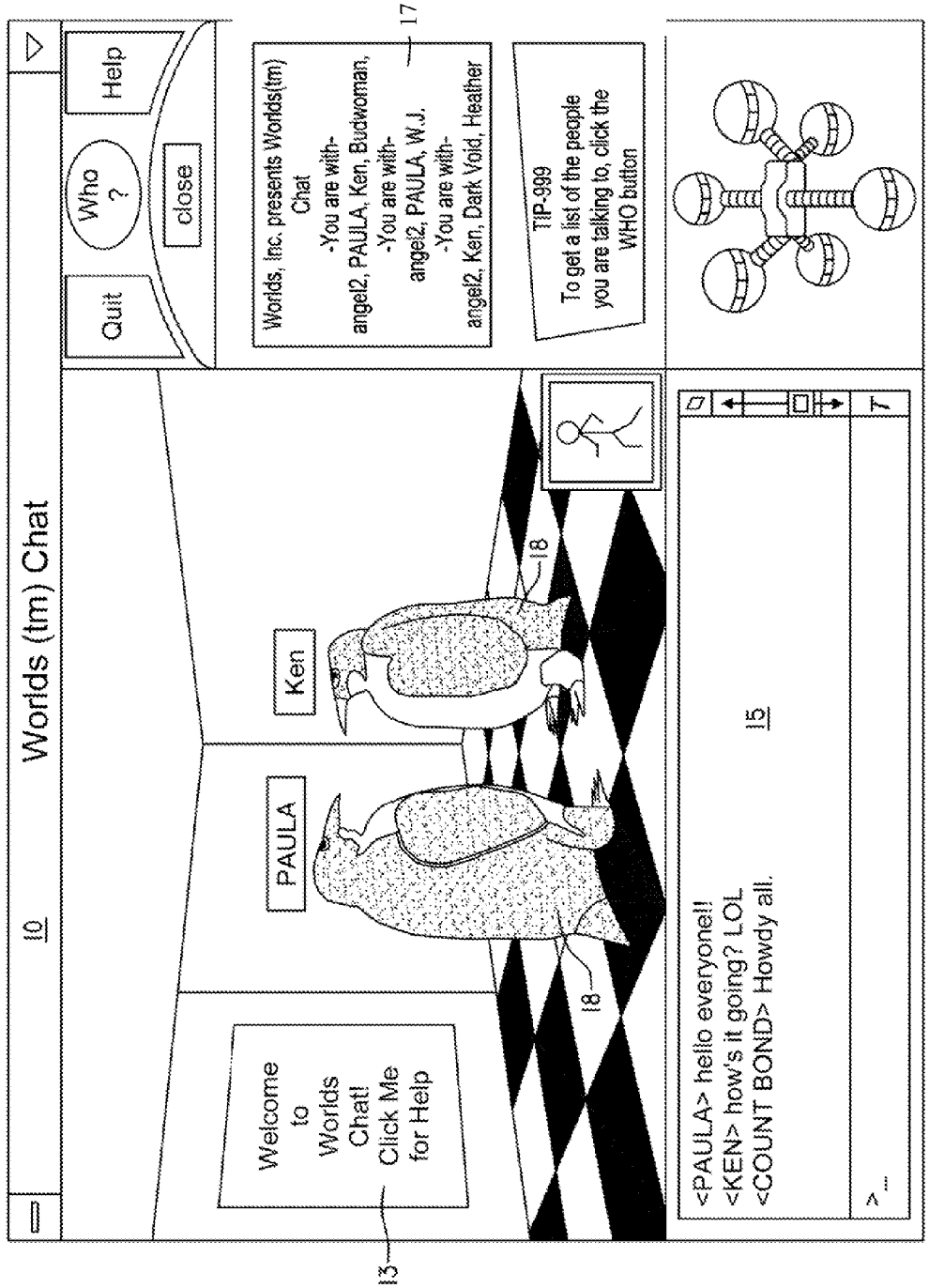
FIG. 1 is a client screen view in a virtual world system according to the present invention.

Although the preferred embodiment of the present invention can be used in a variety of applications, as will be apparent after reading the below description, the preferred embodiment is described herein using the example of a client-server architecture for use in a virtual world "chat" system. In this chat system, a user at each client system interacts with one or more other users at other client systems by inputting messages and sounds and by performing actions, where these messages and actions are seen and acted upon by other clients. FIG. 1 is an example of what such a client might display.

Each user interacts with a client system and the client system is networked to a virtual world server. The client system are desktop computers, terminals, dedicated game controllers, workstations, or similar devices which have graphical displays and user input devices. The term "client" generally refers to a client machine, system and/or process, but is also used to refer to the client and the user controlling the client.

FIG. 1 is an illustration of a client screen display 10 seen by one user in the chat system. Screen display 10 is shown with several stationary objects (wall, floor, ceiling and clickable object 13) and two "avatars" 18. Each avatar 18 is a three dimensional figure chosen by a user to represent the user in the virtual world. Each avatar 18 optionally includes a label chosen by the user. In this example, two users are shown: "Paula" and "Ken", who have chosen the "robot" avatar and the penguin avatar, respectively. Each user interacts with a client machine (not shown) which produces a display similar to screen display 10, but from the perspective of the avatar for that client/user. Screen display 10 is the view from the perspective of a third user, D, whose avatar is not shown since D's avatar is not within D's own view. Typically, a user cannot see his or her own avatar unless the chat system allows "our of body" viewing or the avatar's image is reflected in a mirrored object in the virtual world.

Each user is free to move his or her avatar around in the virtual world. In order that each user see the correct location of each of the other avatars, each client machine sends its current location, or changes in its current location, to the server and receives updated position information of the other clients.

While FIG. 1 shows two avatars (and implies a third), typically many more avatars will be present. A typical virtual world will also be more complex than a single room. The virtual world view shown in FIG. 1 is part of a virtual world of several rooms and connecting hallways as indicated in a world map panel 19, and may include hundreds or users and their avatars. So that the virtual world is scalable to a large number of clients, the virtual world server must be much more discriminating as to what data is provided to each clients. In the example of FIG. 1, although a status panel 17 indicates that six other avatars are present, many other avatars are in the room, but are filtered out for crowd control.

Figure 2:
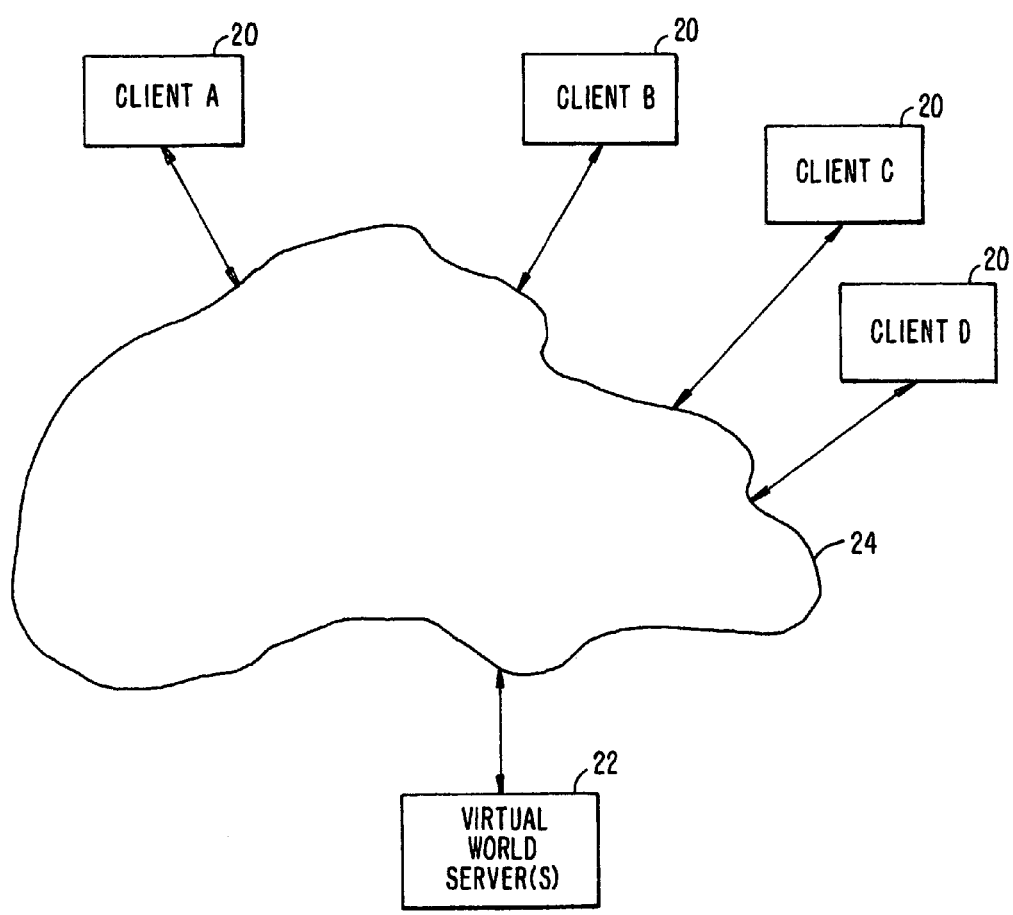
FIG. 2 is a logical block diagram of the hardware elements of a virtual world system.

FIG. 2 is a simplified block diagram of the physical architecture of the virtual world chat system. Several clients 20 are shown which correspond with the users controlling avatars 18 shown in screen display 10. These clients 20 interact with the virtual world server 22 as well as the other clients 20 over a network 24 which, in the specific embodiment discussed here, is a TCP/IP network such as the Internet. Typically, the link from the client is narrowband, such as 14.4 kbps (kilobits/second).

Typically, but not always, each client 20 is implemented as a separate computer and one or more computer systems are used to implement virtual world server 22. As used here, the computer system could be a desktop computer as are well known in the art, which use CPU's available from Intel Corporation, Motorola, SUN Microsystems, Inc., International Business Machines (IBM), or the like and are controlled by operation systems such as the Windows® program which runs under the MS-DOS operating system available from Microsoft Corporation, the Macintosh® O/S from Apple Computer, or the Unix® operating system available from a variety of vendors. Other suitable computer systems include notebook computers, palmtop computers, hand-held programmable computing devices, special purpose graphical game machines (e.g., those sold by Sony, SEGA, Nintendo, etc.), workstations, terminals, and the like.

The virtual world chat system is described below with reference to at least two hypothetical users, A and B. Generally, the actions of the system are described with reference to the perspective of user A. It is to be understood that, where appropriate, what is said about user A applies to user B, and vice versa, and that the description below also holds for a system with more than two users (by having multiple users A and/or B). Therefore, where an interaction between user A and user B is described, implied therein is that the interaction could take place just as well with users A and B having their roles reversed and could take place in the same manner between user A and user C, user D, etc. The architecture is described with reference to a system where each user is associated with their own client computer system separate from the network and servers, however a person of ordinary skill in the art of network configuration would understand, after reading this description, how to vary the architecture to fit other physical arrangements, such as multiple users per computer system or a system using more complex network routing structures than those shown here. A person of ordinary skill in the art of computer programming will also understand that where a process is described with reference to a client or server, that process could be a program executed by a CPU in that client or server system and the program could be stored in a permanent memory, such as a hard drive or read-only memory (ROM), or in temporary memory, such as random access memory (RAM). A person of ordinary skill in the art of computer programming will also understand how to store, modify and access data structures which are shown to be accessible by a client or server.

Figure 3:
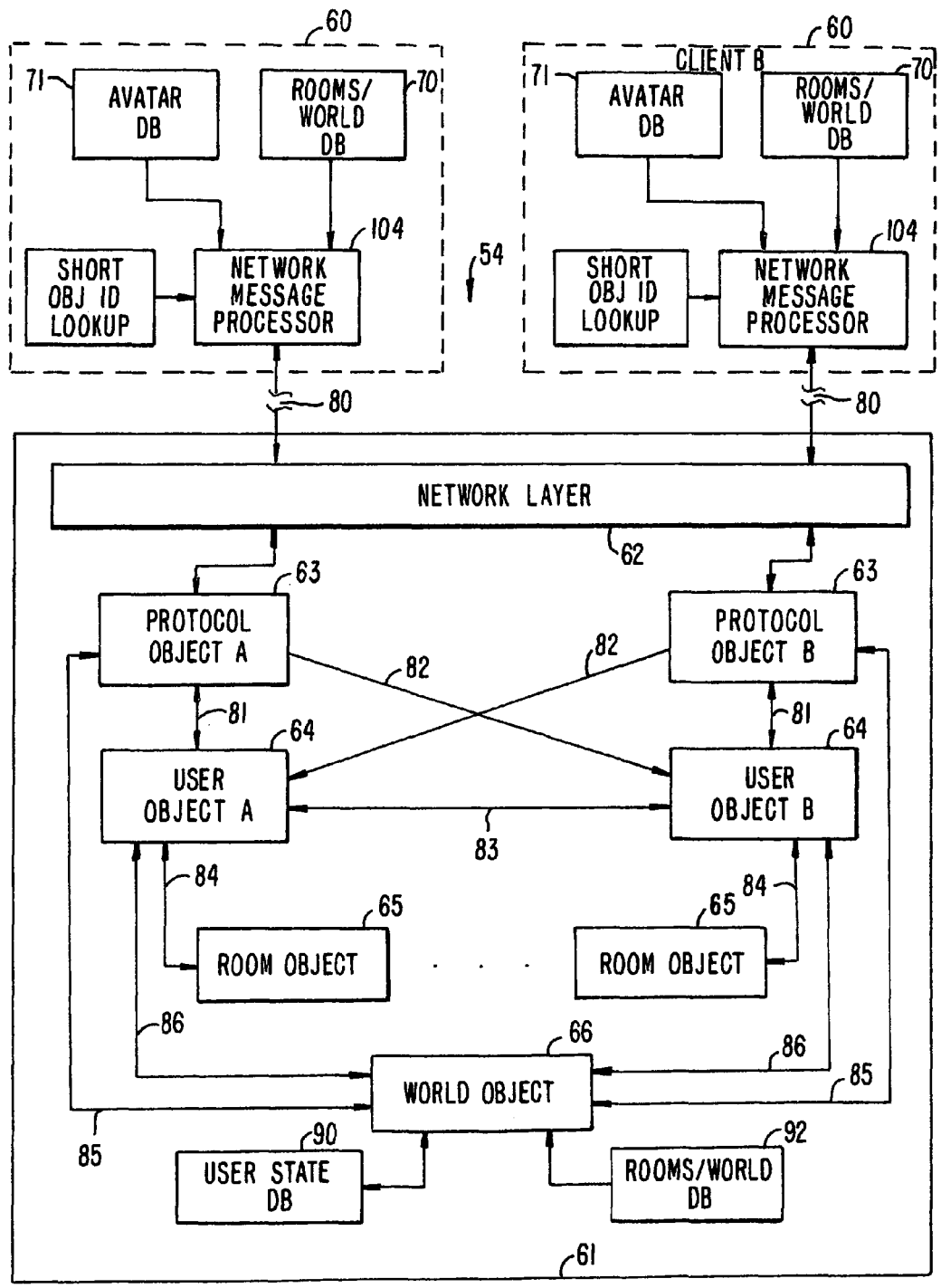
FIG. 3 is a block diagram of the elements of one embodiment of a virtual world system, showing two clients and one server.

Referring now to FIG. 3, a block diagram is shown of a world system 54 in which a user A, at a first client system 60 (client A), interacts with a user B at a second client system 60 (client B) via a server 61. Client system 60 includes several databases, some of which are fixed and some of which are modifiable. Client system 60 also includes storage for program routines. Mechanisms for storing, reading and modifying data on computers such as client system 60 are well known in the art, as are methods and means for executing programs and displaying graphical results thereof. One such program executed by client system 60 is a graphical rendering engine which generates the user's view of the virtual world.

Figure 4:
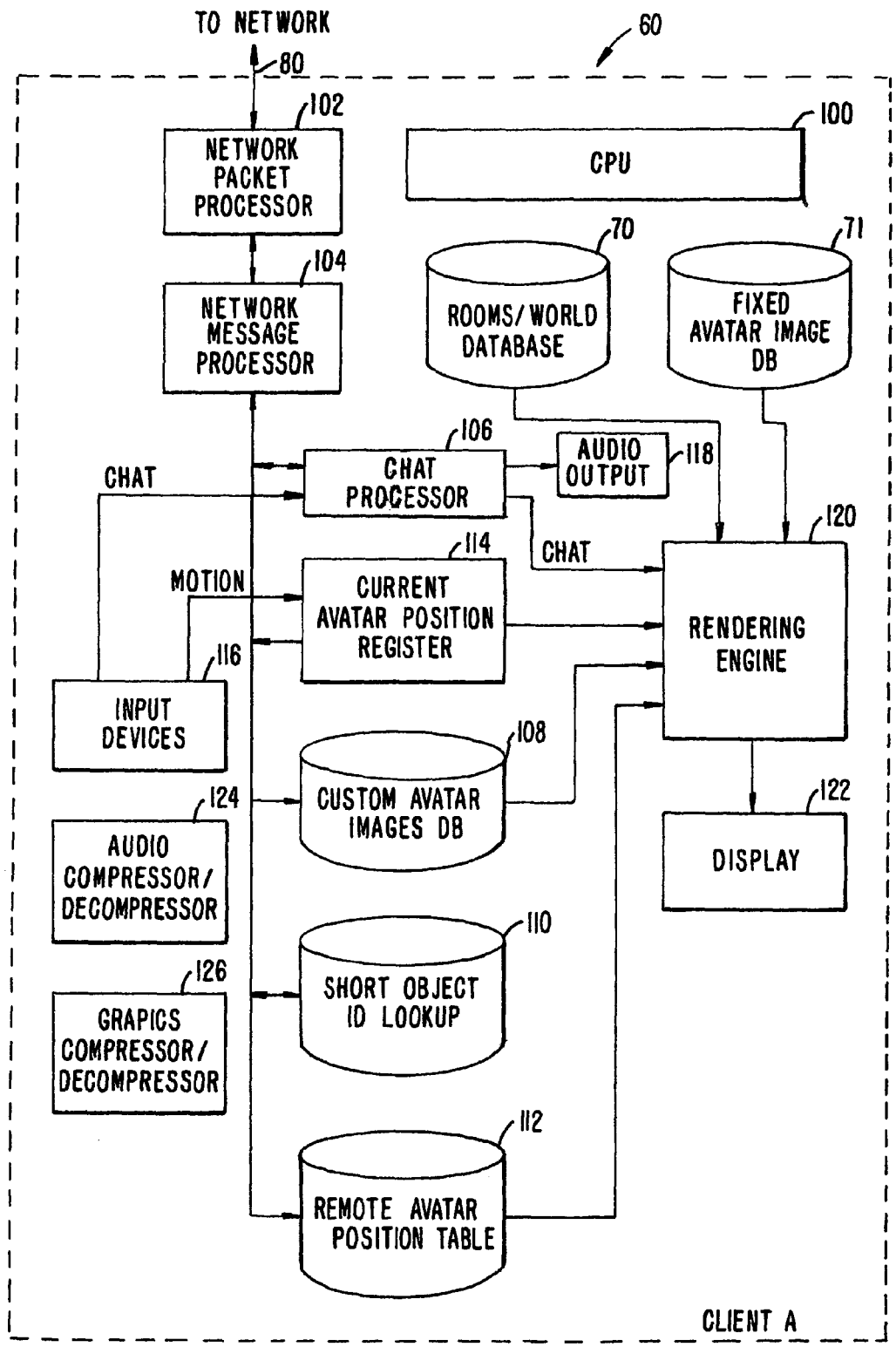
FIG. 4 is a more detailed block diagram of a client system according to one embodiment of the present invention.

Referring now to FIG. 4, a detailed block diagram of client 60 used by a user, A is shown. The other clients used by other users are similar to client 60.

The various components of client 60 are controlled by CPU 100. A network packet processor 102 sends and receives packets over network connection 80. Incoming packets are passed to a network message processor 104 which routes the message, as appropriate to, a chat processor 106, a custom avatar images-database 108, a short object ID lookup table 110, or a remote avatar position table 112. Outgoing packets are passed to network packet processor 102 by network message processor in response to messages received from chat processor 106, short object ID lookup table 110 or a current avatar position register 114.

Chat processor 106 receives messages which contain conversation (text and/or audio) or other data received from other users and sends out conversation or other data directed to other users. The particular outgoing conversation is provided to chat processor 106 by input devices 116, which might include a keyboard, microphones, digital video cameras, and the like. The routing of the conversation message depends on a selection by user A. User A can select to send a text message to everyone whose client is currently on line ("broadcast"), to only those users whose avatars are "in range" of A's avatar ("talk"), or to only a specific user ("whispering"). The conversation received by chat processor 106 is typically received with an indication of the distribution of the conversation. For example, a text message might have a "whisper" label prepended to it. If the received conversation is audio, chat processor 106 routes it to an audio output device 118. Audio output device 118 is a speaker coupled to a sound card, or the like, as is well known in the art of personal computer audio systems. If the received conversation is textual, it is routed to a rendering engine 120 where the text is integrated into a graphical display 122. Alternatively, the text might be displayed in a region of display 122 distinct from a graphically rendered region.

Current avatar position register 114 contains the current position and orientation of A's avatar in the virtual world. This position is communicated to other clients via network message processor 104. The position stored in register 114 is updated in response to input from input devices 116. For example, a mouse movement might be interpreted as a change in the current position of A's avatar. Register 114 also provides the current position to rendering engine 120, to inform rendering engine 120 of the correct view point for rendering.

Remote avatar position table 112 contains the current positions of the "in range" avatars near A's avatar. Whether another avatar is in range is determined a "crowd control" function, which is needed in some cases to ensure that neither client 60 nor user A get overwhelmed by the crowds of avatars likely to occur in a popular virtual world.

Server 61 maintains a variable, N, which sets the maximum number of other avatars A will see. Client 60 also maintains a variable, N', which might be less than N, which indicates the maximum number of avatars client 60 wants to see and/or hear. The value of N' can be sent by client 0 to server 61. One reason for setting N' less than N is where client 60 is executed by a computer with less computing power than an average machine and tracking N avatars would make processing and rendering of the virtual world too slow. Once the number of avatars to be shown is determined, server 61 determines which N avatars are closest to A's avatar, based on which room of the world A's avatar is in and the coordinates of the avatars. This process is explained in further detail below. If there are less than N avatars in a room which does not have open doors or transparent walls and client 60 has not limited the view to less than N avatars, A will see all the avatars in the room. Those avatars are thus "neighboring" which means that client 60 will display them.

Generally, the limit set by server 61 of N avatars and the limit set by client 60 of N' avatars control how many avatars A sees. If server 61 sets a very high value for N, then the limit set by client 60 is the only controlling factor. In some cases, the definition of "neighboring" might be controlled by other factors besides proximity. For example, the virtual world might have a video telephone object where A can speak with and see a remote avatar. Also, where N or more unfriendly avatars are in close proximity to A's avatar and they persist in following A's avatar, A will not be able to see or communicate with other, friendly avatars. To prevent this problem, user A might have a way to filter out avatars on other variables in addition to proximity, such as user ID.

In any case, remote avatar position table 112 contains an entry for each neighboring avatar. That entry indicates where the remote avatar is (its position), its orientation, a pointer to an avatar image, and possible other data about the avatar such as its user's ID and name. The position of the avatar is needed for rendering the avatar in the correct place. Where N' is less than N, the client also uses position data to select N' avatars from the N avatars provided by the server. The orientation is needed for rendering because the avatar images are three-dimensional and look different (in most cases) from different angles. The pointer to an avatar image is an index into a table of preselected avatar images, fixed avatar image database 71, or custom avatar images database 108. In a simple embodiment, each avatar image comprises M panels (where M is greater than two with eight being a suitable number) and the i-th panel is the view of the avatar at an angle of 360*i/M degrees. Custom avatar images are created by individual users and sent out over network connection 80 to other clients 60 which are neighbors of the custom avatar user.

Short object ID lookup table 110 is used to make communications over network connection 80 more efficient. Instead of fully specifying an object, such as a particular panel in a particular room of a world avatar, a message is sent from server 61 associating an object's full identification with a short code. These associations are stored in short object ID lookup table 110. In addition to specifying avatars, the short object ID's can be used to identify other objects, such as a panel in a particular room.

Short object ID lookup table 110 might also store purely local associations. Although not shown in FIG. 4, it is to be understood that connections are present between elements shown and CPU 100 as needed to perform the operations described herein. For example, an unshown connection would exist between CPU 100 and short object ID lookup table 110 to add, modify and delete local short object ID associations. Similarly, CPU 100 has unshown connections to rendering engine 120, current avatar position register 114 and the like.

Client 60 includes a rooms database 70, which describes the rooms in the virtual world and the interconnecting passageways. A room need not be an actual room with four walls, a floor and a ceiling, but might be simply a logical open space with constraints on where a user can move his or her avatar.

CPU 100, or a specific motion control process, limits the motion of an avatar, notwithstanding commands from input devices 116 to do so, to obey the constraints indicated in rooms database 70. A user may direct his or her avatar through a doorway between two rooms, and if provided in the virtual world, may teleport from one room to another.

Client 60 also includes an audio compressor/decompressor 124 and a graphics compressor/decompressor 126. These allow for efficient transport of audio and graphics data over network connection 80.

In operation, client 60 starts a virtual world session with user A selecting an avatar from fixed avatar image database 71 or generating a custom avatar image. In practice, custom avatar image database 108 might be combined with fixed avatar image database 71 into a modifiable avatar image database. In either case, user A selects an avatar image and a pointer to the selected image is stored in current avatar position register 114. The pointer is also communicated to server 61 via network connection 80. Client 60 also sends server 61 the current position and orientation of A's avatar, which is typically fixed during the initialization of register 114 to be the same position and orientation each time.

Rooms database 70 in a fixed virtual world is provided to the user with the software required to instantiate the client. Rooms database 70 specifies a list of rooms, including walls, doors and other connecting passageways. Client 60 uses the locations of walls and other objects to determine how A's avatar's position is constrained. Rooms database 70 also contains the texture maps used to texture the walls and other objects. Avatar database 71 specifies the bitmaps used to render various predefined avatars provided with the client system. Using rooms database 70 and the locations, tags and images of all the neighboring avatars, then a view of objects and other avatars in the virtual world can be rendered using the room primitives database and the avatar primitives database.

Instead of storing all the information needed for rendering each room separately, a primitives database can be incorporated as part of rooms database 70. The entries in this primitives database describe how to render an object (e.g., wall, hill, tree, light, door, window, mirror, sign, floor, road). With the mirrored primitive, the world is not actually mirrored, just the avatar is. This is done by mapping the avatar to another location on the other side of the mirrored surface and making the mirror transparent. This will be particularly useful where custom avatars are created, or where interaction with the environment changes the look of the avatar (shark bites off arm, etc.).

The typical object is inactive, in that its only effect is being viewed. Some objects cause an action to occur when the user clicks on the object, while some objects just take an action when their activating condition occurs. An example of the former is the clickable objects 13 shown in FIG. 1 which brings up a help screen. An example of the latter is the escalator object. When a user's avatar enters the escalator's zone of control, the avatar's location is changed by the escalator object automatically (like a real escalator).

The avatars in fixed avatar image database 71 or custom avatar images database 108 contain entries which are used to render the avatars. A typical entry in the database comprises N two-dimensional panels, where the i-th panel is the view of the avatar from an angle of 360*i/N degrees. Each entry includes a tag used to specify the avatar.

In rendering a view, client 60 requests the locations, orientations and avatar image pointers of neighboring remote avatars from server 61 and the server's responses are stored in remote avatar position table 112. Server 61 might also respond with entries for short object ID lookup table 110. Alternatively, the updates can be done asynchronously, with server 61 sending periodic updates in response to a client request or automatically without request.

Rendering engine 120 then reads register 114, remote avatar position table 112, rooms database 70 and avatar image databases as required, and rendering engine 120 renders a view of the virtual world from the view point (position and orientation) of A's avatar. As input devices 116 indicate motion, the contents of register 114 are updated and rendering engine 120 re-renders the view. Rendering engine 120 might periodically update the view, or it may only update the view upon movement of either A's avatar or remote avatars.

Chat processor 106 accepts chat instructions from user A via input devices 116 and sends conversation messages to server 61 for distribution to the appropriate remote clients. If chat processor 106 receives chat messages, it either routes them to audio output device 118 or to rendering engine 120 for display.

Input devices 116 supply various inputs from the user to signal motion. To make movement easier and more natural, client 60 performs several unique operations. One such operation is "squared forward movement" which makes it easier for the user to move straight. Unlike ordinary mouse movements, where one mouse tick forward results in an avatar movement forward one unit and one mouse tick to the left or right results in side movement of one unit, squared forward movement squares the forward/backward ticks or takes the square root of the sideways ticks or divides by the number of forward/backward ticks. For example, if the user moves the mouse F mouse ticks forward, the avatar moves F screen units forward, whereas if the user moves the mouse F mouse units forward and L mouse units to the left, the avatar moves F units forward and L/F screen units to the left. For covering nonlinear distances, (F, L) mouse units (i.e., F forward, L to the side) might translate to ($F^2$, L) screen units.

As mentioned above, user input could also be used to signal a desire for interaction with the environment (e.g. clicking on a clickable object). User input could also be used to signal for a viewpoint change (e.g. head rotation without the avatar moving, chat inputs and login/logout inputs.

In summary, client 60 provides an efficient way to display a virtual, graphical, three-dimensional world in which a user interacts with other users by manipulating the positions of his or her avatar and sends chat messages to other users.

Network connection 80 will now be further described. Commonly, network connection 80 is a TIC/IP network connection between client 60 and server 61. This connection stays open as long as client 60 is logged in. This connection might be over a dedicated line from client 60, or might be a SLIP/PPP connection as is well known in the art of network connection.

The network messages which pass over network connection 80 between client 60 and server 61 are described immediately below briefly, with a more detailed description in Appendix A. Three main protocols exist for messaging between client 60 and server 61: 1) A control protocol, 2) a document protocol, and 3) a stream protocol. The control protocol is used to pass position updates and state changes back and forth between client 60 and server 61. The control protocol works with a very low bandwidth connection.

The document protocol is used between client 60 and server 61 to download documents (text, graphics, sound, etc.) based on Uniform Resource Locators (URLs). This protocol is a subset of the well-known HTTP (Hyper-Text Transport Protocol). This protocol is used relatively sparingly, and thus bandwidth is not as much of a concern as it is with the control protocol. In the document protocol, client 60 sends a document request specifying the document's URL and server 61 returns a copy of the specified document or returns an error (the URL was malformed, the requested URL was not found, etc.).

The stream protocol is used to transfer real-time video and audio data between client 60 and server 61. Bandwidth is not as much a concern here as it is with the control protocol.

Each room, object, and user in a virtual world is uniquely identified by a string name and/or numerical identifier. For efficient communications, string names are not passed with each message between client 60 and server 61, but are sent once, if needed, and stored in short object ID lookup table 110. Thereafter, each message referring to an object or a user need only refer to the short object ID which, for 256 or less objects, is only an 8-bit value. Rooms are identified by a unique numerical value contained in two bytes (16 bits).

The control protocol is used by client 60 to report the location and state information, such a "on" and "off" states for a light object or other properties, for user A to server 61 and is used by server 61 to send updates to client 60 for remote avatar position table 112 and updates of characteristics of other objects in the virtual world environment. Server 61 also uses the control protocol to update client 61 on which avatars are in range of A's avatar. To allow for piecemeal upgrading of a virtual world system, client 60 will not err upon receipt of a message it does not understand, but will ignore such as message, as it is likely to be a message for a later version of client 60.

Each message is formed into a control packet and control packets assume a very brief form so that many packets can be communicated quickly over a narrowband channel. These control packets are not to be confused with TCP/IP or UDP packets, although a control packet might be communicated in one or more TCP/IP or UDP packets or more than one control packet might be communicated in one TCP/IP packet. The format of a control packet is shown in Table 1.

TABLE 1

| FIELD | SIZE | DESCRIPTION |
| --- | --- | --- |
| PktSize | UInt8 | Number of bytes in the control packet (including Pktsize byte) |
| ObjID | UInt8 (ShortObjID) 0string (LongObjID) | Identifies the object to which the command is directed |
| Command | UInt8 + arguments | Describes what to do with the object |

"UInt8" is an 8-bit unsigned integer. "0string" is a byte containing zero (indicating that a long object identifier is to follow) followed by a string (which is defined to be a byte containing the size of the string followed by the characters of the string). Each control packet contains one command or one set of combined commands. The ObjID field is one of two formats: either a ShortObjID (0 to 255) or a LongObjID (a string). The ObjID field determines which object in the client's world will handle the command. Several ShortObjID values are preassigned as shown in Table2.

TABLE 2

| ShortObjID | Object |
| --- | --- |
| 0 | A short ObjID of 0 indicates that a Long ObjID follows |
| 1 | The Client's Avatar |
| 254 | CO—Combine Object |
| 255 | PO—Protocol Object |

The other ShortObjID values are assigned by server 61 to represent objects in the virtual world. These assignments are communicated to client 60 in a control packet as explained below. The assignments are stored by client 60 in short object ID lookup table 110. The ShortObjID references are shorthand for an object which can also be referenced by a LongObjID.

When commands are directed at the CO object (ShortObjID=254), those commands are interpreted as a set of more than one command. When commands are directed at the PO object, the command applies to the communications process itself. For example, the REGOBJIDCMD command, which registers an association between a ShortObjID and a LongObjID, is directed at the PO object. Upon receipt of this command, client 60 registers the association in the short object ID lookup table.

A command takes the form of a command type, which is a number between 0 and 255, followed by a string of arguments as needed by the particular command.

The CO object is the recipient of sets of commands. One use of a set of commands is to update the positions of several avatars without requiring a separate control packet for each avatar, thus further saving network bandwidth. The form of the command is exemplified by the following command to move objects 2 and 4 (objects 2 and 4 are remote avatars):

S>C CO SHORTLOCCMD [2 −10 −20 −90][4 0 0 90]

In the above control packet, "S>C" indicates the direction of the packet (from server to client), CO is the object, SHORTLOCCMD is the command type, and the command type is followed by three abbreviated commands. The above control packet requires only fifteen bytes: one for packet size (not shown), one for the CO object ID, one for the command type and twelve for the three abbreviated commands. Note that the "S>C" indicator is not part of the control packet. The position of the boundaries between commands (indicated above with brackets, which are not actually communicated) is inferred from the fact that the SHORTLOCCMD command type requires four byte-wide arguments. Each abbreviated command in a command set is the same size, for easy parsing of the commands by the CO. Examples of abbreviated commands for which a CO command is useful are the Teleport, Appear, Disappear, and ShortLocation commands. These commands, and other commands, are described in more detail in Appendix A. Appendix A also shows the one byte representation of SHORTLOCCMD as well as the one byte representations of other command types. The contents of control packets described herein are shown in a readable form, however when transmitted over network connection 80, the control packets are compacted using the values shown in Appendix A.

The following examples show various uses of control packets. In the following sequences, a line beginning with "S>C" denotes a control packet sent from server 61 to client 60, which operates user A's avatar and interacts with user A. Similarly, a, line beginning with "C>S" denotes a control packet sent from client 60 to server 61. Note that all of the lines shown below omit the packet size, which is assumed to be present at the start of the control packet, and that all of the lines are shown in readable format, not the compact, efficient format discussed above and shown in Appendix A.

The following is a control packet for associating ShortObjIDs with Long Object names:

S>C PO REGOBJIDCMD "Maclen" 5

Server 61 determines what short object ID (ShortObjID) to use for a given object. With four pre-allocated Short ObjID values, server 61 can set up 252 other ID values. In the above command, the object whose long name is "Maclen" is assigned the ShortObjID of 5. This association is stored by client 60 in short object ID lookup table 110. The first two fields of the above command line, "PO" and "REGOBJID-CMD" indicate that the protocol object (PO) is to handle the command and indicate the command type (REGOBJID-CMD). The actual binary for the command is, in hexadecimal (except for the string):

S>C FF OD 06 Maclen 05

The following is a control packet containing a chat message:

C>S CLIENT TEXTCMD " " "Kyle, How is the weather?"

The ObjID field is set to CLIENT. The field following the command type (TEXCMD) is unused in a text command from client to server. Server 61 will indicate the proper ObjID of user A's avatar when sending this message back out to the remote clients who will receive this chat message. Thus, server 61 might respond to the above command by sending out the following control packet to the remote clients (assuming user A is named "Judy"):

S>C CLIENT TEXTCMD "Judy" "Kyle, How is the weather?"

Of course, the text "Judy" need not be sent. If a short object identifier has been registered with the client for Judy's avatar, only the ShortObjID for "Judy" need be sent. User A may also whisper a command to a single user who may or may not be in the same room, or even in the same virtual world. For example:

C>S CLIENT WHISPERCMD "Kyle" "Kyle, How are you?"

Server 61 will route this message directly to the recipient user. On the recipient client, the control packet for the message will arrive with the ObjID of the sender (just like a TEXTCMD), however, that client will know that it is a private message because of the command type. The remote client receives the following control packet from server 61:

S>C CLIENT WHISPERCMD "Judy" "Kyle, How are you?"

Other examples of control packets, such as those for entering and exiting sessions and applications, are shown in Appendix B. For state and property changes, objects have two kinds of attribute variables. The first kind of attribute values are "states" which represent boolean values. The second kind of attribute values are called "properties" and may contain any kind of information. Client 60 reports local attribute changes to server 61 as needed and server 61 reports to client 60 the attribute changes which might affect client 60. A different command is used for each kind of attribute, as shown in Appendix B.

From user A's point of view, avatars will appear and disappear from A's view in a number of circumstances. For example, avatars enter and leave rooms and move in and out of visual range (as handled by crowd control rules described below). Avatars also teleport from room to room, which is different than moving in and out of rooms. Client 60 will send server 61 the following location and/or room change commands under the circumstances indicated:

LOCATIONCMD: normal movement of A's avatar
ROOMCHGCMD: changing rooms by walking
TELEPORTCMD: changing rooms and/or location by teleporting
TELEPORTCMD, ExitType=0: entering the application
TILEPORTCMD, EntryType=0: exiting the application.

When other, remote clients take such actions, server 61 sends control packets to client 60, such as:

TELEPORTCMD: remote avatar teleported (EntryType or ExitType may be 0 if the exit or entry was not visible to user A)

DISAPPEARACTORCMD: remote avatar was previously visible (in range), but is now invisible (out of range) due to normal (non-teleport) movement including having walked out of the room APPEARACTORCMD: remote avatar was not visible, and is now visible (command includes the remote avatar's Location and Room)

SHORTLOCCMD or LONGLOCCMD: remote avatar was visible before, and is still now, but has moved.

Two methods exist for updating the position of an actor (avatar). The LONGLOCCMD method uses full absolute position (X, Y, and Z) and orientation. The SHORTLOCCMD only updates the X and Y coordinates and the orientation. In addition, the short method limits the change in position to plus or minus 127 in the X and/or Y coordinates and/or +/−127 in the orientation. Client 60 sends a LONGLOCCMD to server 61 to update the client's position. Whenever possible, server 61 uses the combined SHORTLOCCMD to update all of the visible avatars at once. If an avatar has moved too great a distance, or has moved in the Z direction, server 61 then uses a LONGLOCCMD for that avatar.

The following is an example of a control packet sent from client 60 to server 61 to update user A's location:

C>S CLIENT LONGLOCCMD 2134 287 7199 14003

In the binary (given in hex), this is:

C>S 01 01 0856 011F 1C1F 36B3

Note that bytes are two digits and shorts (16 bits) are four digits. They are separated by spaces here for clarity. The actual packet would contain no spaces.

The Server often uses the combined short location update command. This command concatenates several ShortLocationCommands. Rather than sending a command to each of the objects in question, a single combined command is sent to the combine object (CO). This object takes the command and applies it to a list of truncated commands. The truncated commands contain a ShortObjID reference to the object to be moved and a change in the X and Y positions and orientation. If server 61 wants to update the positions of objects 56, 42 and 193, it would send the following:

S>C CO SHORTLOCCMD 56 −4 6 −10 42 21 3 −50 193 −3 −21 10

This command can contain a variable number of subcommands. Each subcommand is of fixed length so that the CO can find the length of it from a table check or other quick lookup method. The binary form of this command is:

S>C FE 04 38 FC 06 F6 2A 15 03 CD C1 FD EB 10

When user A changes rooms by walking through a door, a RoomChangeCommand control packet is sent by client 60 to server 61 to inform server 61 that the room change occurred. The command specifies the new room and location for user A's avatar as follows:

C>S CLIENT ROOMCHNGCMD 01 25 1200 150 180

The first argument is the ObjID of the avatar that is leaving the room, the second argument is the command type (room change), and the third argument is the room that the avatar is entering. The next three arguments are the X, Y and Z positions at which to place the avatar in the room. The last argument is the direction the actor is facing (orientation). Note that the first argument is always the ObjID for the local avatar, CLIENT=1.

When user A teleports from one room to another, the TeleportCommand is sent by client 60 to server 61 to inform server 61 that the teleport occurred. The method of leaving the room and entering the new one is sent to server 61. This allows server 61 to inform other clients to display explosions or clouds, smoke or other indications of the teleportation appearance/disappearance of the avatar. The teleport command is as follows:

C>S CLIENT TELEPORTCMD 01 02 02 25 1200 150 180

The first argument is the ObjID of the avatar that is teleporting, the second argument is the command type (teleport), and the third argument is the room that the avatar is entering. The next two arguments are the leaving method and the entering method respectively. The next three arguments are the X, Y and Z positions at which to place the actor in the room. The last argument is the direction the actor is facing (orientation). Note that the first argument is always the ObjID for the local avatar, CLIENT=1.

Client 60 is responsible for implementing some sort of caching mechanism for actors. When client 60 receives a TeleportCommand or AppearCommand for an avatar that is appearing, it must first determine if it currently has information for the specified object cached. If not, client 60 can issue a request for any needed information pertaining to the object. Suppose client 60 receives the following command specifying that "Mitra" has arrived at room 15:

S>C "Mitral" TELEPORTCMD 15 3 3 0 0 0 0

If client 60 does not have an entry cached for this object ("Mitra"), or if the entry is dated, a request may be made for pertinent information (here, the long object ID is used since client 60 does not have the short object Id association for this object):

C>S "Mitra" PROPREQCMD VAR_BITMAP

Server 61 will respond with a PropertyCommand as necessary to communicate the required information. An example of pertinent information above is a request for the avatar bitmap to use to represent mitra.

Crowd control is one of the tougher problems solved by the present system. Crowd control is handled using a number of commands. In a typical situation, the number of avatars in a room is too large to be handled by client 60 and displayed on display 122. The maximum number of avatars, N, is determined by server 61, but might also be determined for each client.

Server 61 addresses this problem by maintaining, for each user, a list of the N avatars nearest to the location of that user's avatar. This list may be managed by the server in any of a number of ways. When an avatar (B, for example) is removed from another user's (C, for example) list because avatar B can no longer be seen by C (i.e., B is no longer one of the N nearest avatars), Server 61 sends a DISAPPEARACTORCMD to the object for avatar B on client C. This occurs as a consequence of client B changing rooms with a ROOMCHANGECMD or TELEPORTCMD, or due to crowd control.

Client 60 does not necessarily delete an entry from remote avatar lookup table 112 or short object ID lookup table 110 if a remote avatar disappears, but just marks it as being non-visible. In some cases, a user can see another user's avatar, but that other user cannot see the first user's avatar. In other words, visibility is not symmetric. However, chat exchange is symmetric, i.e., a user can only talk to those who can talk to the user.

When A's avatar is to be added to user B's lists when A becomes visible to B by reason of movement, room change, crowd control, or the like, server 61 (more precisely the protocol object PO on server 61) sends a REGOBJIDCMD control packet to the PO of B's client 60 and B's client 60 will add the association of A's avatar with a short object ID to short object ID lookup table 110. Server 61 also sends an APPEARACTORCMD control packet to A's client giving the room and location of B. If A's client 60 does not have the appropriate information cached for B, A's client 60 sends a PropertyRequestCommand control packet to server 61 asking for the properties of B, such as the bitmap to use to display B's avatar. Server 61 will return the requested information, which it might need to obtain from B's client 60. For example, the control packet:

PROPREQCMD VAR_BITMAP might be used. Whenever possible, location updates from server 61 will be sent as SHORTLOCCMD control packets addressed to the remote avatar using its ShortObjId and the DisappearActorCommands, AppearActorCommands, and TeleportCommands used to update client 60 on the status of visible remote avatars will be combined as described for the ShortLocationCommands.

The server 61 shown in FIG. 3 will now be described. Server 61 comprises generally a network layer 62, protocol objects 63, user objects 64, room objects 65. In an object oriented software embodiment of the invention, each of these objects and layers are implemented as objects with their specific methods, data structures and interfaces. Where server 61 is implemented on a hardware running the Unix operating system, these objects might be objects in a single process or multiple processes. Where server 61 is implemented on hardware running the Windows™ operating system alone or in combination with the MS-DOS operating system or the like, the layers and objects might be implemented as OLE (Object Linking and Embedding) objects.

One protocol object 63 and one user object 64 are instantiated for each user who logs into server 61. Network layers 62 accepts TCP/IP connections from clients 60. A socket is opened and command buffers are allocated for each client 60. Network layer 62 is responsible for instantiating a protocol object 63 for each TCP/IP socket established. This layer handles the sending and receiving of packets, such as control packets, document packets and stream packets, over the network. All sockets are examined by server 61 on a periodic basis; completed control packets received from a client 60 are processed by server 61, and outgoing control packets to a client 60 which are pending are sent.

Protocol object 63 handles translation of internal messages to and from the cryptic and compressed form of the control packets which are sent over network connection 80, as explained in Appendices A and B. Protocol object 63 handles all session initialization and authentication for its client 60, and is responsible for instantiating a user object 64 for authenticated users.

User object 64 tracks the location of its user's avatar, which includes at least the room in which the user is located, the user's coordinates in the room and the user's orientation in that room. User object 64 also maintains a list of the N nearest neighboring remote avatars (i.e., avatars other than the avatar for the user object's client/user) in the room. This list is used to notify the user object's client 60 regarding changes in the N closest remote avatars and their locations in the room. The list is also used in disseminating text typed by the user to only those users nearest him or her in the room. This process of notifying client 60 of only the N nearest neighbors is handled as part of crowd control.

One room object 65 is instantiated for each room in rooms database 70 and the instantiation is done when server 61 is initialized. Alternatively, room objects can be instantiated as they are needed. As explained above, the term "room" is not limited to a visualization of a typical room, but covers any region of the virtual world which could be grouped together, such as the underwater portion of a lake, a valley, or a collection of streets. The room object for a specific room maintains a list of the users currently located in that room. Room object 65 periodically analyzes the positions of all users in the room using a cell-based algorithm, and sends a message to each user object 64 corresponding to those users in the room, where the message notifies the user object of its user's N nearest neighbors.

Periodically, the locations of the users in each room are examined and a square two-dimensional bounding box is placed around the users' current locations in the room. This square bounding box is then subdivided into a set of square cells. Each user is placed in exactly one square. Then, for each user, the cells are scanned in an outwardly expanding wave beginning with the cell containing the current user of interest, until at least N neighbors of that user are found. If more than N are found, the list of neighbors is sorted, and the closest N are taken.

One or more world object 66 may be instantiated at the time server 61 is started. The world object maintains a list of all the users currently in the world and communicates with their user objects 64. The world object also maintains a list of all the rooms in the world and communicates with the room objects 65 for those rooms. The world object periodically initiates the analysis of user positions in each room and subsequent updating of avatar information to clients (60). In addition, the world object periodically initiates the collection of statistics on usage (for billing, study of which rooms are most popular, security logs, etc.) which are logged to a file.

Server 61 also has a rooms/world database 92 which is similar to the rooms/world database 70 in client 60. Server 61 does not need the primitives databases because there is no display needed at the server. Server 61 does, however, include a user state database 90, which maintains state information on each user, such as address, log-in time, accounting information, etc.

Several interconnections are shown in FIG. 3. Path 81 between a protocol object 63 and a user object 64 carries messages between a client 60 and the user object 64 representing that client (before or after having been translated by a protocol object 63). Typical messages from the client to the user object include:

Move my avatar to (x, y, z, orientation)
Send a text message to all neighboring remote avatars
Typical messages from the user object to the client are:
User X teleported into your view at (x, y, z, orient.)
User Z has just left your view
User W has moved to (x, y, z, orientation)
Here is text from user Y
Here is private text (whispered) from user A The path 82 between a client 60 and a user object 64 other than its own user object 64 is used to send whispers from user to user. Path 83 is used for internal messages sent directly between user objects 64. Messages taking this path typically go from a given user to those users who are among its N nearest neighbors. Typical messages include:

Here is text I have typed
I have just teleported to a given room and location
I have changed my state (logged in, logged out, etc.)
I have changed one or more of my properties Path 84 is used for messages between a user object 64 and a room object 65. User objects 64 communicate their location to the room 65 they are currently in. Periodically, the room object will notify the user object of the identities and locations of the users' N nearest neighbors. Messages from the user object to the room include:

I have just teleported either into or out of this room
I have just entered this room
I have just left this room
My new location in this room is (x, y, z, orientation)

Figure 5:
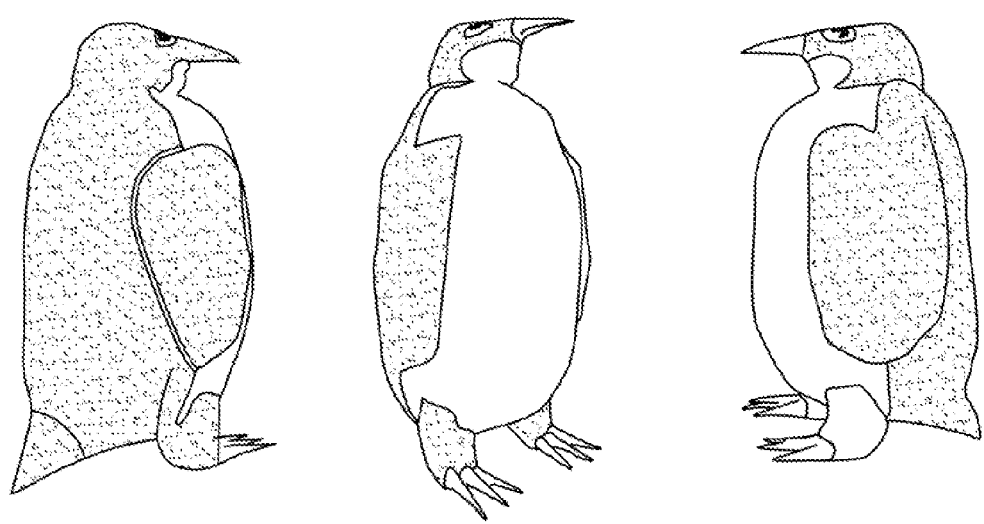
FIG. 5 is an illustration of an avatar.

The only message that passes from the room object to a user object is the one that notifies the user of its N nearest neighbors. Path 85 is used for communications between protocol objects and world object 66. Protocol object 63 can query world object 66 regarding the memory address (or functional call handle) of the user object 64 representing a given user in the system. This is the method that is used to send a whisper message directly from the protocol object to the recipient user object. Path 86 is used for communications between user object 64 and world object 66 to query the world object regarding the memory address or function call handle of the room object 65 representing a given room in the world. This is required when a user is changing rooms. FIG. 5 is an illustration of the penguin avatar rotated to various angles.

The above description is illustrative and not restrictive. Many variations of the invention will become apparent to those of skill in the art upon review of this disclosure. The scope of the invention should, therefore, be determined not with reference to the above description, but instead should be determined with reference to the appended claims along with their full scope of equivalents.

APPENDIX A

Client/Server Control Protocol Commands (in BNF)
Valid CommandTypes are integers between 0 and 255. Several of these are shown below as part of the
BNF (Backus-Nauer Format) description of the command structures. Per convention, words starting with uppercase characters are non-terminals while those in quotes or in lowercase are terminal literals.

Basics
a | b = Either a or b.
"abc" = The exact string of characters a, b and c in the order shown.
$a^+$ = One or more occurrences of a.
$a^*$ = Zero or more occurrences of a.
10 = A number 10. In the ASCII protocol, this is the ASCII string "10", in the binary form, it is a byte with a value of 10.
N . . . M = A numerical range from N to M.
Equivalent to: N | N + I | N + 2 | . . . | M − 1 | M Command Structures
Packet = PktSize Message
PktSize = UInt8 (size includes PktSize field)
Message = ObjID Command
ObjID = LongObjID | ShortObjID
LongObjID = 0String
ShortObjID = UInt8
Command = CommandType CommandData
CommandType = UInt8
[Other commands might be added to these:]
Command = LongLocationCommand
| ShortLocationCommand
| StateCommand
| PropertyCommand
| PropertyRequestCommand
| CombinedCommand
| RoomChangeCommand
| SessionInitCommand
| SessionExitCommand
| ApplicationInitCommand
| ApplicationExitCommand
| DisappearActorCommand
| AppearActorCommand
| RegisterObjIdCommand
| TeleportCommand
| TextCommand
| ObjectInfoCommand
| LaunchAppCommand
| UnknownCommand
| WhisperCommand
| StateRequestCommand

APPENDIX A-continued

Client/Server Control Protocol Commands (in BNF)
Valid CommandTypes are integers between 0 and 255. Several of these are shown below as part of the BNF (Backus-Nauer Format) description of the command structures. Per convention, words starting with uppercase characters are non-terminals while those in quotes or in lowercase are terminal literals.

| | |
|---|---|
| TeleportCommand | = TELEPORTCMD NewRoom ExitType EntryType |
| Location | |
| RoomChangeCommand | = ROOMCHNGCMD NewRoom Location |
| LongLocationCommand | = LONGLOOCMD Location |
| DisappearActorCommand | = DISAPPEARACTORCMD |
| AppearActorCommand | = APPEARACTORCMD NewRoom Location |
| Location | = X Y Z Direction |
| X, Y, Z, Direction | = SInt16 |
| StateCommand | = STATECMD Setflags ClearFlags |
| SetFlags, ClearFlags | = UInt32 |
| PropertyCommand | = PROPCMD Property+ |
| PropertyRequestCommand | = PROPREQCMD VariableID* |
| StateRequestCommand | = STATEREQCMD |
| Property | = VariableID VariableValue |
| VariableID | = ShortVariableID | LongVariableId |
| Short VariableId | = UInt8 |
| LongVariableId | = 0String |
| VariableValue | = String |
| ShortLocationCommand | = SHORTLOCCMD DeltaX DeltaY DeltaO |
| DeltaX, DeltaY | = SByte |
| DeltaO | = SByte (plus 128 to −128 degrees) |
| CombinedCommand | = CombinedLocationCommand \| CombinedAppearCommand \| CombinedTeleportCommand \| CombinedDisappearCommand \| UnknownCombinedCommand |
| CombinedLocationCommand | = SHORTLOCCMD AbbrevLocCommand+ |
| AbbrevLocCommand | = ShortObjID DeltaX DeltaY DeltaO |
| CombinedAppearCommand | = APPEARACTORCMD AbbrevAppearCommand+ |
| AbbrevAppearCommand | = ShortObjID NewRoom Location |
| CombinedDisappearCommand | = DISAPPEARACTORCMD AbbrevDisappearCommand+ |
| AbbrevDisappearCommand | = ShortObjID |
| CombinedTeleportCommand | = TELEPORTCMD AbbrevTeleportCommand+ |
| AbbrevTeleportCommand | = ShortObjID NewRoom ExitType EntryType Location |
| [for now:] | |
| UnknownCombinedCommand | = 0 . . . 3, 5 . . .10, 13 . . . 17, 19 . . . 255 |
| NewRoom | = UInt16 |
| ExitType, EntryType | = UInt8 |
| SessionInitCommand | = SESSIONINITCMD Property+ |
| SessionExitCommand | = SESSIONEXITCMD Property+ |
| ApplicationInitCommand | = APPINITCMD Property+ |
| ApplicationExitCommand | = APPEXITCMD Property+ |
| RegisterObjIdCommand | = REGOBJIDCMD String ShortObjID |
| TextCommand | = TEXTCMD ObjID String |
| WhisperCommand | = WHISPERCMD ObjID String |
| LaunchAppCommand | = LAUNCHAPPCMD String |
| [for now:] | |
| UnknownCommand | = 0, 15, 20 . . . 255 |
| String | = StringSize Char* |
| StringSize | = UInt8 (size of string EXCLUDING StringSize field) |
| Char | = C datatype char |
| UInt32 | = 0 . . . 4294967299 (32-bit unsigned) |
| SInt32 | = −2147483650 . . . 2147483649 (32-bit signed value) |
| UInt16 | = 0 . . . 65535 (16-bit unsigned value) |
| SInt16 | = −32768 . . . 32767 (16-bit signed value) |
| UInt8 | = 0 . . . 255 (8-bit unsigned value) |
| SByte | = −128 . . . 127 (8-bit signed value) |
| LONGLOCCMD | = 1 |
| STATECMD | = 2 |
| PROPCMD | = 3 |
| SHORTLOCCMD | = 4 |
| ROOMCHNGCMD | = 5 |
| SESSIONINITCMD | = 6 |
| SESSIONEXITCMD | = 7 |
| APPINITCMD | = 8 |
| APPEXITMD | = 9 |
| PROPREQCMD | = 10 |
| DISAPPEARACTORCMD | = 11 |
| APPEARACTORCMD | = 12 |
| REGOBJIDCMD | = 13 |
| TEXTCMD | = 14 |
| LAUNCHAPPCMD | = 16 |
| WHISPERCMD | = 17 |
| TELEPORTCMD | = 18 |
| STATEREQCMD | = 19 |
| CLIENT | = 1 |
| CO | = 254 |
| PO | = 255 |

APPENDIX B

Additional Control packet Examples

B.1. State and PropertyChanges

State changes change a string of boolean values. Either the Client or the Server can send these. Each object can have up to 32 different state values. These are represented as bits in a bit string, if the Client wants to set bit 3 of the state variable of an object, 137, it sends the following:

C>S 137 STATECMD 4 0

In binary (given as hexadecimal) this is:

C>S 89 02 00000004 00000000

Properties take more possible values than states. Similar to state variables, properties are referenced in order. Variables may be represented as a predefined ID (counting from 1) or by an arbitrary string.

Assuming that the Client has changed its local copy of a variable (with the tag 6) ao object 23. It would send a command to the Server as follows:

C>S 23 PROPCMD 6 "a new value"

The variable ID is a predefined shorthand name for a variable name. These names are predefined and hardcoded into the Client. They generally can't be changed without changing the Client executable. An old Client that sees a variable ID it does not know must ignore the command.

APPENDIX B-continued

Additional Control packet Examples

Some variables will always be defined, "bitmap" for example. These are defined in a fixed manner at the Client level. The Client will simply send these variable IDs to the Server which will transparently pass them on to other Clients.
The currently defined variable IDs are:
VAR_APPNAME = 1 // Name of Application to run
VAR_USERNAME    = 2 // User's id.
VA R_PROTOCOL   = 3 // Version of protocol used by client (int)
VAR_ERROR       = 4 // Used in error returns to give error type
VAR_BITMAP = 5 // Filename of Bitmap
VAR_PASSWORD    = 6 // User's password
VAR_ACTORS = 7 // Suggested # of actors to show client (N)
VA R_UPDATETIME = 8 // Suggested update interval (* 1/10 sec.)
VAR_CLIENT = 9 // Version of the client software (int)
The client can request the values for one or more properties with the PROPREQCMD:
    C>S "Fred" PROPREQCMD VAR_BITMAP
    S>C "Fred" PROPCMD VAR_BITMAP "skull.bmp"
A PROPREQCMD with no parameters will result in PROPCMD being returned containing all the properties of the object the request was sent to.
If a PROPREQCMD is made with a request for a property that doesn't exist, an empty PROPCMD will be returned.
A STATEREQCMD requests the Server to respond with the current state.
B.2. Beginning and Exiting Sessions
To begin a session, the Client requests a connection from the Server. After the connection has been established, the Client sends a SessionInitCommand,
The SessionInitCommand should contain the User's textual name (preferably, this textual name is unique across all applications) and the version of the protocol to be used, For example, the User named "Bo" has established a connection and would now like to initiate a session.
C>S CLIENT SESSIONINITCMD VAR_USERNAME "Bo" VAR_PROTOCOL "11"
Currently defined variables for the SessionInitCmd are:
VAR_USERNAME    The account name of the user
VAR_PASSWORD    User password (preferably a plain text string)
VAR_PROTOCOL    The protocol version (int)
VAR_CLIENT Version of the client software being used (int)
Note that the protocol defines the value as a string, but the (int) comment is a constraint on the values that may be in the string.
The Server will send an ack/nak indicating the success of the request. An ack will take the form:
    S>C CLIENT SESSIONINITCMD VAR_ERROR 0
A nak will take the form:
S>C CLIENT SESSIONINITCMD VAR_ERROR 1
where the value of VAR_ERROR indicates the nature of the problem.
Currently defined naks include:

| | | |
|---|---|---|
| *ACK | 0 | It's OK |
| * NAKBAD_USER | 1 | User name already in use |
| * NAK_MAX_ORDINARY | 2 | Too many ordinary users |
| * NAK_MAX_PRIORITY | 3 | Too many priority users |
| * NAK_BAD_WORLD | 4 | World doesn't exist |
| * NAK_FATAL | 5 | Fatal error (e.g. can't instantiate user) |
| * NAK_BADP_ROTOCOL | 6 | Client running old or wrong protocol |
| * NAK_BAD_CLIENTSW | 7 | Client running old, or wrong version |
| * NAK_BAD_PASSWD | 8 | Wrong password for this user |
| * NAK_CALL_BILLING | 9 | Access denied, call billing |
| * NAK_TRY_SERVER | 10 | Try different server |

B.3. Beginning and Exiting Application
To begin an application, the Client must have already established a session via the SessionInitCommand. To begin an application, the Client sends an ApplicationInitcommand specifying the desired application:
C>S CLIENT APPINITCMD VAR_APPNAME "StarBright"
The Server will respond with an ack/nak to this command using the same technique discussed under session initialization.
B.4. Launching an Outside Application
    The Server may tell the Client to launch an outside application by sending the LaunchAppCommand to the Protocol Object. For example:
    S>C PO LAUNCHAPPCMD "Proshare"

What is claimed is:

1. A client computer configured to enable a first user controlling a first avatar in a virtual space to perform actions in the virtual space, the virtual space comprising a plurality of avatars of a plurality of other users, each user of the plurality of other users being associated with an avatar representing said each user in the virtual space, the first user being associated with the first avatar, the client computer comprising:
    an input device;
    a display;
    non-transitory data storage storing:
        instructions, and
        a rooms database defining constraints on movements of the first avatar in the virtual space, the rooms database comprising data defining appearances of a plurality of objects in the virtual space, the plurality of objects comprising a first object;
    and
    at least one processor programmed using the instructions to:
        move the first avatar in the virtual world in response to first avatar positioning data,
        determine one or more avatars of the other users to be displayed on the display, and cause an action to be performed in response to a selection of the first object through the input device, wherein the first object comprises a portion having an appearance conveying a message, and the message refers to the action.

2. A client computer according to claim 1, wherein the message is at least partially textual, and the at least one processor is further programmed using the instructions to display the portion having the appearance conveying the message.

3. A client computer according to claim 2, wherein the at least one processor is further programmed using the instructions to cause the action in response to the selection being made by clicking on the portion having the appearance conveying the message.

4. A client computer according to claim 2, wherein the first object has at least two dimensions.

5. A client computer according to claim 2, wherein the first object is three-dimensional.

6. A client computer according to claim 5, wherein the non-transitory data storage further stores an avatar image database comprising entries for rendering at least some avatars.

7. A client computer according to claim 5, wherein the first avatar and the plurality of other avatars are three-dimensional avatars.

8. A client computer according to claim 1, wherein the action comprises displaying additional information on the display.

9. A client computer according to claim 1, wherein the action comprises rendering additional information for the first user.

10. A client computer according to claim 1, wherein the rooms database comprises data obtained from a central server.

11. A client computer according to claim 1, wherein the at least one processor is further programmed using the instructions to determine the one or more avatars of the other users to be displayed on the display based on available computing and networking resources of the client computer.

12. A method for a first user at a client computer controlling a first avatar of a virtual space to act in the virtual space, the virtual space comprising a plurality of avatars of a plurality of other users, each user of the plurality of other users being associated with an avatar of the plurality of avatars representing said each user in the virtual space, the first user being associated with the first avatar, the virtual space further comprising the first avatar, the method comprising steps of:
storing in the client computer a rooms database defining constraints on movements of the first avatar in the virtual space, the rooms database further comprising data defining appearances of a plurality of objects in the virtual space, the plurality of objects comprising a first object;
executing instructions on the client computer to move the first avatar in the virtual world in response to first avatar positioning data received through an input device of the client computer;
executing instructions on the client computer to determine one or more avatars of the other users to be displayed on a display device of the client computer;
executing instructions on the client computer to receive through the input device a selection of the first object; and
executing instructions on the client computer causing an action to be performed in response to the selection, wherein the first object comprises a portion having appearance conveying a message, and the message refers to the action.

13. A method according to claim 12, wherein the selection comprises clicking on the portion by the first user.

14. A method according to claim 12, wherein the first object is three-dimensional.

15. A method according to claim 14, the method further comprising:
storing at the client device an avatar image database comprising entries for rendering at least some avatars of the plurality of avatars.

16. A method according to claim 14, wherein the first avatar and the plurality of other avatars are three-dimensional avatars.

17. A method according to claim 12, wherein the action comprises displaying additional information on the display device.

18. A method according to claim 12, wherein the step of executing instructions on the client computer to determine the one or more avatars of the other users to be displayed on the display device of the client computer comprises executing instructions to determine the one or more avatars of the other users displayable on the display device based on at least one of computing resources of the client computer and networking resources of the client computer.

19. A method according to claim 12, further comprising executing instructions on the client computer to receive at the client computer the rooms database from a central server over a computer network.

20. An article of manufacture comprising a machine readable memory device storing computer code for performing a method for a first user controlling a first avatar of a virtual space to act in the virtual space, the virtual space comprising a plurality of avatars of a plurality of other users, each user of the plurality of other users being associated with an avatar representing said each user in the virtual space, the first user being associated with the first avatar, the method comprising steps of:
storing at a client device a rooms database comprising data defining constraints on movements of the first avatar in the virtual space, the rooms database further comprising data defining appearances of a plurality of objects in the virtual space, the plurality of objects comprising a first object;
moving the first avatar in the virtual world in response to first avatar positioning data received through a human interface device of the client computer;
determining at the client device one or more avatars of the other users to be displayed on a display device of the client device;
receiving by the client device through the human interface device a selection of the first object; and
causing an action to be performed in response to the selection, wherein the first object comprises a portion having an appearance conveying a message, and the message refers to the action.

* * * * *